(12) United States Patent
Gregg

(10) Patent No.: US 6,901,527 B2
(45) Date of Patent: May 31, 2005

(54) SYNCHRONIZING MULTIPLE TIME STAMPS DISTRIBUTED WITHIN A COMPUTER SYSTEM WITH MAIN TIME OF DAY REGISTER

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 09/961,015

(22) Filed: Sep. 21, 2001

(65) Prior Publication Data

US 2003/0065963 A1 Apr. 3, 2003

(51) Int. Cl.[7] .............................. G06F 1/04; G06F 1/12
(52) U.S. Cl. ...................................... 713/500; 713/400
(58) Field of Search ................................. 713/500, 400

(56) References Cited

U.S. PATENT DOCUMENTS 5,579,513 A * 11/1996 Strohmer .................... 713/600
5,600,822 A * 2/1997 Grice et al. .................. 712/16
6,763,474 B1 * 7/2004 Boerstler et al. ........... 713/400

* cited by examiner

Primary Examiner—Lynne H. Browne
Assistant Examiner—Eric Chang
(74) Attorney, Agent, or Firm—Lynn L. Augspurger

(57) ABSTRACT

A method and computer system synchronize timing registers located throughout the computer system so that trace data from various sources in the system can be coordinated in time. This invention solves the problem when the multiple time stamp registers are loosely synchronized by relatively slow common timing pulses, but the phase relationship of the multiple time stamps to the common timing pulses is unknown to the firmware. By adding hardware to measure this phase relationship, the firmware can access this phase information to coordinate the time stamp information.

7 Claims, 3 Drawing Sheets

US 6,901,527 B2

SYNCHRONIZING MULTIPLE TIME STAMPS DISTRIBUTED WITHIN A COMPUTER SYSTEM WITH MAIN TIME OF DAY REGISTER

FIELD OF THE INVENTION

This invention relates to the implementation of remote time stamps in large mainframes, and in particular for use with an apparatus described a method for synchronizing these time stamps to the Time of Day so the Time Of Day counters are synchronized so that trace data from various sources in the system can be time coordinated.

BACKGROUND OF THE INVENTION

Throughout computer systems, individual counters are used to keep track of time of day for trace time stamps.

Event tracing and logging is one of the most important tools used to debug computer designs, and one of the most useful pieces of information in each entry is a time stamp. Time stamps obviously point out time delays in the system, but they are also very valuable in coordinating multiple trace entries generated my multiple processes in the system.

Systems are often designed with multiple entities in different parts of the system generating independent trace entries, and processes often span multiple entities. The trace data is usually gathered by a single processor that has access to a Time of Day (TOD) register. However, the time stamps provided in trace entries provided by remote (to the processor) entities may have only a loose relationship to the TOD.

SUMMARY OF THE INVENTION

This invention relates to the implementation of remote time stamps in large mainframes, and describes a method and apparatus to synchronize these time stamps to the TOD. The method for synchronizing these time stamps to the Time of Day enables the Time Of Day counters to be synchronized so that trace data from various sources in the system can be time coordinated.

In particular, this method for synchronizing distributed time stamps, comprises having a master Time of Day register in a processor driven by an oscillator and having this oscillator drive an independent register that generates a timing pulse with any arbitrary phase with respect to said Time of Day register. Then this generated timing pulse drives a time register in a remote element. Additional timing facilities in the remote element are capable of determining the phase relationship between said Time of Day and said time registers.

Further, this invention solves the problem when the multiple time stamp registers are loosely synchronized by relatively slow common timing pulses, but the phase relationship of the multiple time stamps to the common timing pulses is unknown to the firmware. Added hardware measures this phase relationship, and the firmware can access this phase information to coordinate the time stamp information.

BRIEF DESCRIPTION OF THE DRAWINGS

The characteristics of the invention are set forth in the appended claims which will be described by reference the drawings in the following detailed description of an illustrative embodiment.

DETAILED DESCRIPTION OF THE PREFERRED EMBODIMENT

Although exact timing and bit assignments are described in this embodiment, this invention may used with a wide range of timing, bit assignments, and timing accuracy. The method which the described apparatus performs enables synchronizing of the computer system's various time stamps to the Time of Day and thus enables the Time Of Day counters to be synchronized so that trace data from various sources in the system can be time coordinated.

Figure 1:
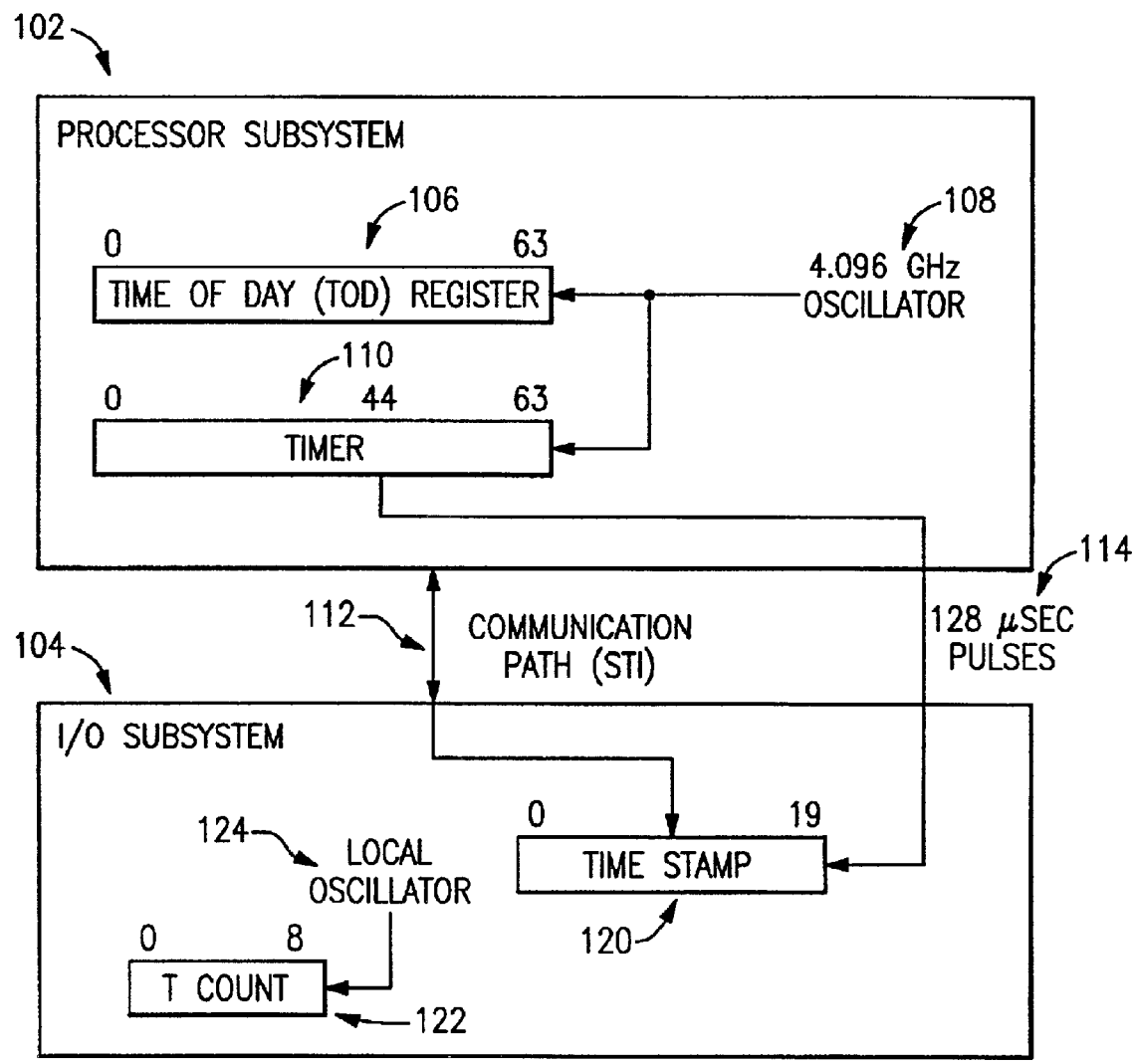
FIG. 1 illustrates a system containing a processor and an I/O subsystem.

FIG. 1 shows a system containing a processor 102 and an I/O 104 subsystem. The processor subsystem 102 contains the main Time of Day (TOD) register 106. The TOD 106 is typically 64 bits and is driven from a 4.096 GHz clock 108. Actual implementations usually do not include all of the low order bits since the required TOD precision is presently only about 1 microsecond. The same system oscillator 108 usually drives other timers (usually on different chips) at the same rate as the TOD is driven; however, only the TOD 106 is observable to processor programs. In FIG. 1, one of these other registers is called the TIMER 110, and this register may have any arbitrary value with respect to the TOD 106, but the TIMER 110 register is guaranteed to step at the same rate as the TOD.

FIG. 1 also shows the timing facilities in the I/O subsystem 104. This remote entity is connected to the processor subsystem by a relatively narrow (pin and bandwidth limited) interface. In this embodiment, the interface is called the Self Timed Interface (STI) 112.

Interface 112 allows the processor subsystem to set and examine facilities in the I/O subsystem through memory mapped load and store processor instructions. A relatively small portion of the STI bandwidth is used to automatically (no processor instructions required) send short timing control packets, shown as 128 microsecond pulses 114, to the I/O subsystem. Bit 45 of the TIMER 110 register in the processor subsystem changes every 64 microseconds, and each time it changes, a timing control packet 114 indicating the state of bit 45 is sent to the I/O subsystem over STI 112. These control packets in effect generate a 128 microsecond period square wave to the I/O subsystem that cycles at the same rate as bit 44 of the processor subsystem TOD 106, but the phase relationship to the TOD is arbitrary.

The I/O subsystem 104 in FIG. 1 contains a TIME STAMP 120 register that is incremented by the 128 microsecond pulses 114 received over STI 112. The width of the TIME STAMP 120 register determines how often it will wrap back to zero. Choice of this width depends on the types of problems expected in the design. The I/O subsystem also contains a T COUNT 122 register that steps at a much higher speed than the TIME STAMP 120 register. T COUNT 122 gives much more precise timing information is stepped by a completely independent oscillator 124 in the I/O subsystem. T COUNT is described in more detail later.

Figure 2:
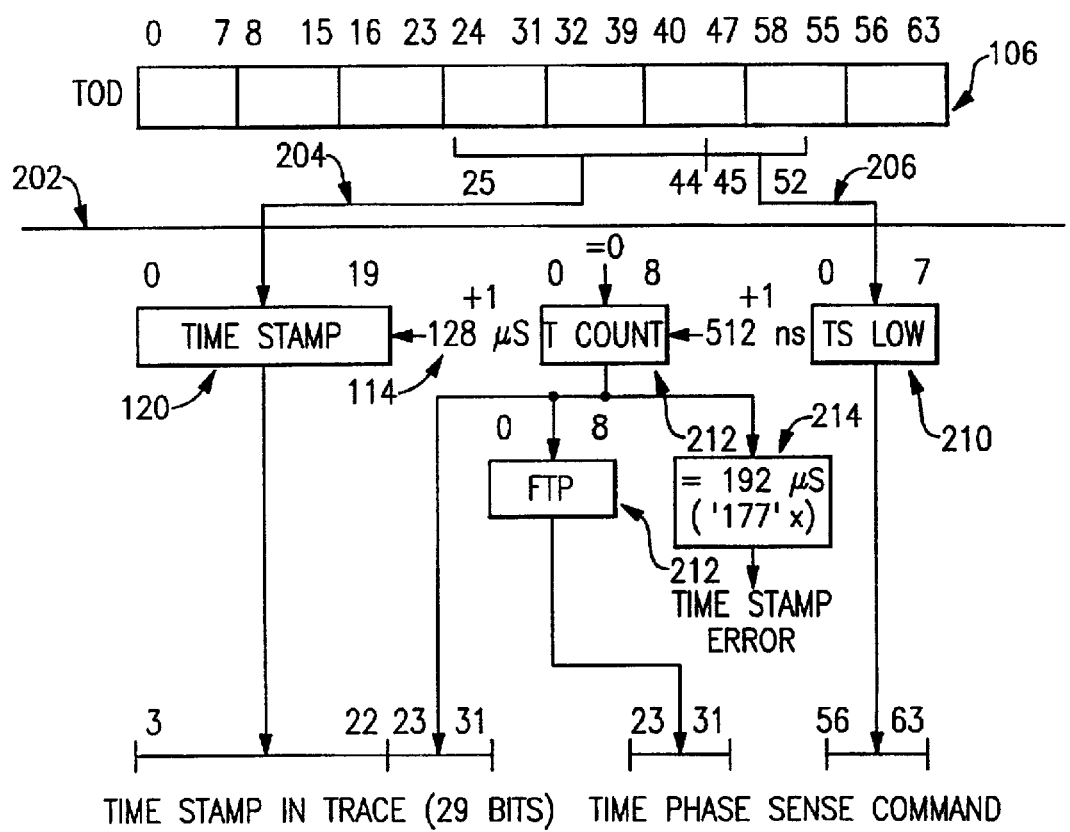
FIG. 2 illustrates the details of the time stamp hardware in the I/O subsystem and how this hardware interacts with the processor subsystem and software.

FIG. 2 shows the details of the time stamp hardware in the I/O subsystem and how this hardware interacts with the processor subsystem and software. The hardware above line 202 is in the processor subsystem 102 and the hardware below line 202 is in the I/O subsystem 104. Arrows 204, 206 represent TOD information sent by the processor firmware to the I/O subsystem over the STI interface 112, and the '+128 us' 114 is the timing pulse received over the STI interface. The TOD 106 register in FIG. 2 is the same as the TOD 106 register in FIG. 1, and it is 64 bits.

The firmware must issue a memory mapped store instruction (called the Time Stamp Command) to the I/O subsystem 104 to loosely synchronize the TIME STAMP 120 register to the processor subsystem TOD 106 register. The TIME STAMP register is used in trace entries and counts 128 microsecond pulses received over STI. Since the generation of the 128 microsecond pulses may have any arbitrary phase with respect to the processor subsystem TOD bit 44 as described above, the I/O subsystem has two registers to capture this phase information, and this information is used by tracing and logging firmware to align the I/O subsystem time stamps to the TOD. The TS LOW 210 register loaded from TOD resister bits 45 through 52 by the Time Stamp Command, and the First Timing Pulse (FTP) 212 register times the interval from the receipt of a Time Stamp Command to the receipt of the first 128 microsecond pulse over STI 112. Detection of missing 128 microsecond pulses is detected by observing the T COUNT 212 register exceeding a preset threshold in circuit 214.

Figure 3:
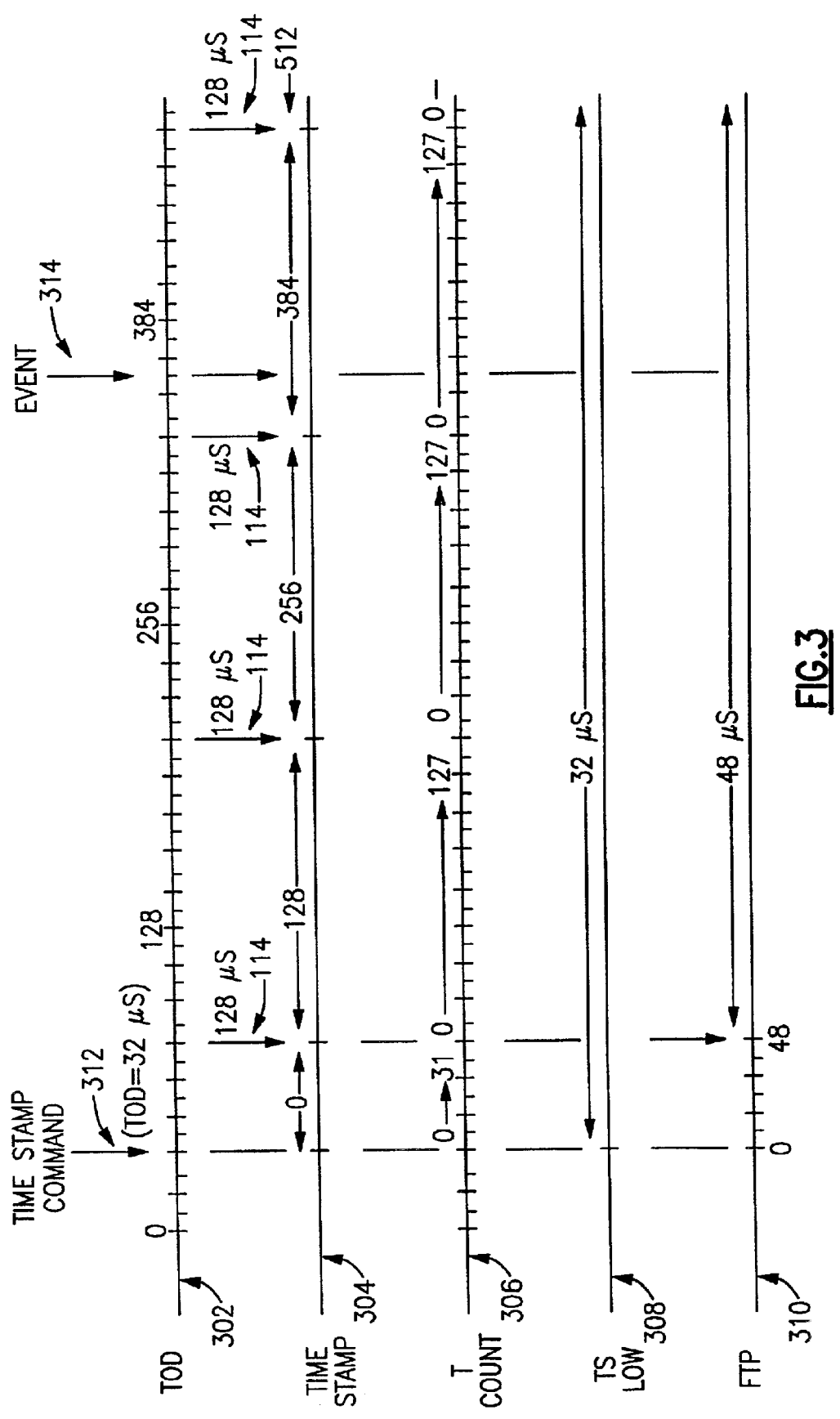
FIG. 3 illustrates the phase differences between the processor Time of Day and the I/O subsystem time registers.

FIG. 3 shows a time line of the TOD 106, TIME STAMP 120, T COUNT 122, TS LOW 210, FTP 212, Time Stamp Command, and 128 microsecond pulses 114. Line 302 is the TOD 106, line 304 is the TIME STAMP 120, line 306 is the T COUNT 122, line 308 is the TS LOW 210, and line 310 is the FTP 212. The Time Stamp Command is indicated by arrow 312, and arrow 314 represents an event to be time stamped in the I/O subsystems.

OPERATIONAL EXAMPLE

The firmware issues a Time Stamp command to the I/O subsystem to loosely synchronize the TIME STAMP 120 register to the TOD 106. As shown in FIG. 2, the Time Stamp Command takes bits 25 through 44 of the TOD 106 and stores them into the 20 bit TIME STAMP 120 register, and takes bits 45 through 52 of the TOD and stores them into the 8 bit TS LOW (Time Stamp Low) 210 register. The TS LOW register is not subsequently altered by the hardware and is simply used to store a portion of the TOD 106 at the time the Time Stamp Command is issued. The Time Stamp Command also causes the T COUNT (Time Count) 120 register to reset to zero. TOD bit 44 changes every 128 microseconds, and bit 52 changes state every 0.5 microseconds. The bits are conveniently aligned on the load/store interface to the I/O subsystem so that the software simply loads to TOD into a general register and then stores the TOD 106 into a memory mapped location in the I/O subsystem. The Time Stamp Command also resets the Time Stamp Error bit.

The time stamp used in trace entries is 29 bits and is generated by two registers. The TIME STAMP 120 register is 20 bits and is incremented by 128 microsecond pulses 114 received over STI 112. With 20 bits, the TIME STAMP register wraps (or repeats) every 2.237 minutes. The low order bits come from the nine bit T COUNT (120) register. This register is incremented by a signal generated from the 16 nanosecond period I/O subsystem oscillator that is completely independent of the processor subsystem TOD oscillator. This oscillator is divided by 32 to generate the T COUNT increment signal with a period of 512 nanoseconds.

Each time the 128 microsecond pulse is detected (rising edge), the TIME STAMP 120 register is incremented and the T COUNT 122 register is set to zero. The T COUNT 120 register can never wrap back to zero between 128 microsecond pulses, and therefore, unique time is represented in the trace time stamps.

Since the generation of the 128 microsecond pulses 114 (signaled by packets over STI 112) may have any arbitrary phase with respect to TOD 106 bit 44, the I/O subsystem has two registers, the 8 bit TS LOW 210 register and the 9 bit FTP (First Timing Pulse) 212 register, to capture this phase information, and this information is used by logging firmware to align the I/O subsystem time stamps to the processor subsystem TOD.

As described above, the Time Stamp Command also causes the T COUNT 122 register to reset to zero. The T COUNT 122 register is incremented by the 512 nanosecond clock until the first 128 microsecond pulse is received. Reception of this first pulse causes the value in the T COUNT 122 register to be captured in the FTP 212 register, the T COUNT 122 register is reset to zero, and the TIME STAMP 120 register is incremented. As a result, the TS LOW 210 and FTP 212 registers contain the information required to calculate the TOD 106 from the trace time stamps.

The 128 microsecond pulses 114 are sent over the STI 112 links as packets, and there is no provision in the STI logic for detecting missing pulses. Since multiple packets with TOD bit 45 information can be sent during any 128 microsecond interval, it is valid for TOD bit 45 to remain in the same state in consecutive packets. Therefore, the only way to detect missing pulses is to observe the T COUNT 122 register reaching a critical value. If the T COUNT register reaches a value of '177'x as detected by circuit 214 (representing 192 microseconds), a Time Stamp Error is recognized and the Time Stamp Error bit in a status register (not shown). Choosing the value of 192 microseconds allows a maximum possible jitter in the 128 microsecond pulse of +/−32 microseconds.

The Timing Phase Sense Command 216 is a memory mapped load instruction executed by the processor subsystem, and it returns Time Stamp phase information with respect to the time sent in the last Time Stamp Command (usually from the TOD). Bits 23 through 31 are the contents of the FTP 212 register and bits 56 through 63 are the contents of the TS LOW 210 register.

| BITS | DEFINITION |
| --- | --- |
| 0:22 | Reserved |
| 23:31 | FTP (First Timing Pulse, 512 nanosecond increments) |
| 32:55 | Reserved |
| 56:63 | TS LOW (0.5 microsecond increments) |

The firmware running in the processor subsystem calculates the TOD value from trace time stamps by first reading the phase information in the TS LOW 210 and FTP 212 registers using the Time Phase Sense Command 216. Each time the Time Stamp Command is executed the phase relationship will change, and the software needs to execute the Time Phase Sense Command 216 to get the new phase information. Next, the values in the T COUNT 122 (low order bits of the trace time stamp 218) and FTP 212 registers are converted to microseconds by multiplying by 0.512, and the value in the TS LOW 210 register is converted to microseconds by dividing by 2. Finally, TOD is calculated by the following equation:

$$TOD \text{ (microseconds)} = (\text{TIME STAMP} + T \text{ COUNT}) + (TS \text{ LOW}) + (FTP) - 128.$$

Note that the phase relationship is determined from the TS LOW+FTP−128 microsecond portion of the equation.

If the value in the TOD 106 is changed by firmware for any reason, the I/O subsystem time stamp facilities will no longer track the TOD.

The operation is shown in a time lines in FIG. 3. The TOD starts at time zero in this example, and after 32 microseconds the firmware issues a Time Stamp Command 312 to set the TIME STAMP 120 register and measure the phase between the TOD and the 128 microsecond pulses. The Time Stamp Command 312 causes the TIME STAMP 120 register to be set to the TOD high order bits (zero in this example). The T COUNT 122 register is also set reset to zero and is allowed to step at the I/O subsystem local oscillator rate. Finally, the TS LOW 210 register captures the low order TOD bits, 32 microseconds in this example.

After 48 microseconds, the first 128 microsecond pulse 114 is received. At this time the value in the TS LOW 210 register is captured in the FTP 212 register (the value is 48 microseconds in this example). As successive 128 microsecond pulses are received, the TIME STAMP 120 register is incremented (each increment representing 128 microseconds), and the T COUNT 122 register is zeroed.

The EVENT 314 occurs at TOD 106 time 360 microseconds. When the EVENT is detected in the I/O subsystem, and it records a TIME STAMP 120 value of 384 microseconds and a T COUNT 122 value of 24 microseconds in its log entry 218. Eventually, when the firmware reads the I/O subsystem log entries, it also reads the values in the TS LOW 210 and FTP 212 registers with the Time Stamp Phase Command 216. In this example:

TOD=360 microseconds
TIME STAMP=384 microseconds
T COUNT=24 microseconds
TS LOW=32 microseconds
FTP=48 microseconds Using the above equation:

$$TOD \text{ (360 microseconds)} = (384 + 24) + 32 + 48 - 128$$
$$= (408 - 48)$$
$$= 360 \text{ microseconds!}$$

Thus, the phase adjustment applied to the I/O subsystem time stamp value is −48 microseconds.

It is important to note that while the present invention has been described in the context of a fully functioning data processing system, those of ordinary skill in the art will appreciate that the firmware controlling the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for synchronizing distributed time stamps in a computer system, comprising the steps of:

providing a main Time of Day register in a processor of said computer system driven by a system oscillator;

causing said system oscillator to drive an independent register in the computer system that generates a timing pulse with any arbitrary phase with respect to said Time of Day register;

coupling said timing pulse to drive a time register in a remote element in said computer system; and providing additional timing facilities in said remote element capable of determining the phase relationship between said Time of Day and said time registers, and said computer system includes said processor which contains said main Time of Day register as a master timing register even though said same system oscillator drives other timer registers at the same rate as the Time of Day is driven; and wherein only the main Time of Day register is observable to processor programs, and wherein each time said one of said other timing registers changes, a timing control packet indicating the state of timing bits of the register is sent to the I/O subsystem of the computer system over a self timed interface to effectively generate a square wave to the I/O subsystem that cycles at the same rate as timing bits of the processor main TOD register, but wherein the phase relationship to the TOD is arbitrary.

2. The method as recited in claim 1, wherein said one of said other timer registers may have any arbitrary value with respect to the main Time of Day register, but the said one of said other timer registers steps at the same rate as the main TOD register.

3. The method as recited in claim 1, wherein said computer system includes said processor and said remote element is in an I/O subsystem of said computer system.

4. A method for synchronizing distributed time stamps in a computer system, comprising the steps of:

providing a main Time of Day register in a processor of said computer system driven by a system oscillator;

causing said system oscillator to drive an independent register in the computer system that generates a timing pulse with any arbitrary phase with respect to said Time of Day register;

coupling said timing pulse to drive a time register in a remote element in said computer system; and providing additional timing facilities in said remote element capable of determining the phase relationship between said Time of Day and said time registers, and said computer system includes said processor which contains said main Time of Day register as a master timing register even though said same system oscillator drives other timer registers at the same rate as the Time of Day is driven; and wherein only the main Time of Day register is observable to processor programs, and wherein firmware running in the processor calculates the Time of Day value from trace time stamps generated with a Time Stamp Command and by first reading the phase information in the timing registers using a Time Phase Sense Command.

5. The method as recited in claim 4, wherein each time a Time Stamp Command is executed the phase relationship will change, and the firmware executes the Time PhaseSense Command to get the new phase information before the values of the Time Of Day are calculated.

6. The method as recited in claim 5, wherein if the value in the Time of Day register is changed by firmware for any reason, the I/O subsystem time stamp facilities of the computer system will no longer track the main Time of Day register.

7. The method as recited in claim 5, wherein after the I/O system no longer track the main Time of Day register the I/O system steps at a I/O subsystem local oscillator rate until such time as the firmware reads the I/O subsystem log entries, and other timing registers with the Time Stamp Phase Command and a phase adjustment is applied to the I/O subsystem time stamp value.

* * * * *